(12) United States Patent
Marks

(10) Patent No.: US 8,137,429 B2
(45) Date of Patent: Mar. 20, 2012

(54) AGRICULTURAL COMPOSITION

(75) Inventor: David Marks, Witherslack (GB)

(73) Assignee: Plant Impact PLC, Manchester (GB)

( * ) Notice: Subject to any disclaimer, the term of this patent is extended or adjusted under 35 U.S.C. 154(b) by 219 days.

(21) Appl. No.: 12/090,038

(22) PCT Filed: Oct. 11, 2006

(86) PCT No.: PCT/GB2006/003764
§ 371 (c)(1),
(2), (4) Date: Aug. 6, 2008

(87) PCT Pub. No.: WO2007/042795
PCT Pub. Date: Apr. 19, 2007

(65) Prior Publication Data
US 2009/0038355 A1    Feb. 12, 2009

(30) Foreign Application Priority Data
Oct. 12, 2005    (GB) .................................. 0520726.1

(51) Int. Cl.
*C05D 9/02* (2006.01)
(52) U.S. Cl. ......................................................... 71/27
(58) Field of Classification Search ....................... 71/27
See application file for complete search history.

(56) References Cited

U.S. PATENT DOCUMENTS

| | | | |
|---|---|---|---|
| 3,178,855 A * | 4/1965 | Siegel | 47/58.1 R |
| 3,459,532 A | 8/1969 | Army et al. | |
| 4,169,717 A | 10/1979 | Ashmead | |
| 5,814,581 A | 9/1998 | Hirakawa et al. | |
| 6,241,795 B1 | 6/2001 | Svec et al. | |
| 6,770,593 B1 | 8/2004 | Williams et al. | |
| 2004/0035162 A1 | 2/2004 | Williams et al. | |

FOREIGN PATENT DOCUMENTS

| | | |
|---|---|---|
| CN | 1154352 A | 7/1997 |
| CN | 1544397 A | 11/2004 |
| DE | 276025 A1 | 2/1990 |
| FR | 2 497 065 A | 7/1982 |
| GB | 2 004 856 A | 4/1979 |
| JP | 11-255601 A | 9/1999 |
| JP | 2000327471 A | 11/2000 |
| WO | WO 99/25191 A1 | 5/1999 |
| WO | WO 00/05954 A1 | 2/2000 |
| WO | WO 01/22822 A1 | 4/2001 |
| WO | WO 2005/102047 A1 | 11/2005 |
| WO | WO 2006/046948 A1 | 5/2006 |

\* cited by examiner

*Primary Examiner* — Stuart Hendrickson
*Assistant Examiner* — Richard M Rump
(74) *Attorney, Agent, or Firm* — Kilpatrick Townsend & Stockton LLP

(57) ABSTRACT

Agricultural compositions which comprise: (i) a secondary nutrient or micronutrient; (ii) benzoic acid or a biologically acceptable derivative thereof; and (iii) a water soluble salt of Formula (I) wherein $R^1$ is a $C_{1-10}$ alkenyl group, or a $C_{2-10}$ alkenyl group and M is a cation of valency n for administering a secondary nutrient or micronutrient to plants. Also formulations containing the compositions and methods of their use are included.

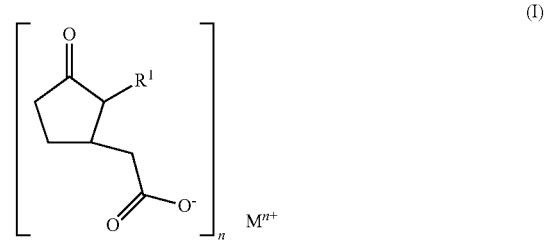

(I)

12 Claims, No Drawings

AGRICULTURAL COMPOSITION

CROSS-REFERENCES TO RELATED APPLICATIONS

This application is a U.S. National Stage Application of PCT/GB2006/003764, filed Oct. 11, 2006, which claims the benefit of Great Britain Application No. 0520726.1, filed Oct. 12, 2005.

The present invention relates to agricultural compositions, in particular to fertilizer compositions, formulations containing them and uses and methods of treating plants utilizing them.

Plants need a range of nutrients for healthy growth. These include macronutrients such as nitrogen, phosphorus, potassium, carbon and water, secondary nutrients such as calcium, magnesium, sodium, chloride and sulphur, as well as micronutrients, which include copper, cobalt, iron, manganese, boron, molybdenum, zinc, silicon and nickel.

The introduction of secondary nutrients and micronutrients into the plant can be difficult. Even though they may be present in significant quantities in the soil, their availability to the plant may be low. The problem is exacerbated where a plant is subjected to suboptimal abiotic conditions.

One method, which has been used hitherto to enhance the availability of these nutrients to the plant is to apply them in conjunction with chemical chelating agents such as EDTA. However, synthetic chemical chelates are damaging to the environment as they do not degrade in the soil and scavenge undesirable elements after completing their purpose.

There is, therefore, a need for a means of improving a plant's ability to take-up secondary nutrients and micronutrients, particularly during conditions of prolonged or transient stress.

The applicants have now found an improved manner of administering secondary nutrients and micronutrients to plants.

The present invention provides an agricultural composition comprising: (i) a secondary nutrient or micronutrient; (ii) benzoic acid or a biologically acceptable derivative or salt thereof; and (iii) a water soluble salt of formula (I)

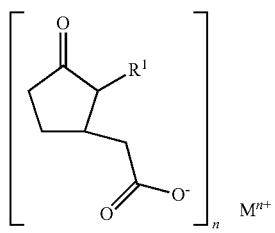

(I)

wherein $R^1$ is a $C_{1-10}$alkyl group, or a $C_{2-10}$alkenyl group and M is a cation of valency n.

Suitably the secondary nutrient or micronutrient is one of those known as trace elements. The secondary nutrient may be calcium, magnesium, sodium, chloride or sulphur. The micronutrient may be copper, cobalt, iron, manganese, boron, molybdenum, zinc, silicon or nickel. One or more secondary nutrient or micronutrient may be present in the composition. It has been found that the present invention is particularly beneficial to the uptake of a combination of secondary or micro-nutrients. It is, therefore, preferred that the composition comprises more than one secondary or micro-nutrient. It is particularly preferred that the composition comprises a combination of: i) copper, iron, manganese and zinc; ii) copper, iron, manganese, magnesium, boron, molybdenum and zinc; iii) copper, magnesium, manganese and zinc; iv) iron and magnesium; v) manganese and zinc; or vi) manganese, zinc and calcium.

The secondary nutrient or micronutrient may be present in the form of a salt. Secondary nutrients and micronutrients are absorbed into a plant by uptake of their water-soluble salts. The salt of the secondary nutrient or micronutrient is, therefore, preferably a water-soluble salt. For use in the present invention suitable water-soluble salts of secondary nutrients and micronutrients include nitrates, sulphates, oxides and chlorides, with nitrates and chlorides being preferred. Specific examples include zinc nitrate, iron sulphate, zinc sulphate, magnesium sulphate, manganese sulphate, iron nitrate or manganese nitrate. In one embodiment of the present invention suitable salts also include salts of the secondary nutrient and micronutrient that are represented by formula (I). In such salts M of formula (I) represents the secondary nutrient or micronutrient. When, however, the only secondary or micronutrient present in the composition is magnesium then it will not be present solely within the composition as the salt of a compound of formula (I), where that compound is dihydrojasmonate.

The salt of secondary nutrient or micronutrient may be present in the composition or formulation of the present invention in an amount of up to 10% v/v, preferably from 5 to 10% v/v and most preferably from 4 to 6% v/v. The total concentration of all secondary nutrient or micronutrient present may be in the concentration range of 0.01% to 40% w/w, preferably in the range of 6% to 30% w/w. The concentration of an individual secondary nutrient or micronutrient present may be in the concentration range of 0.01% to 30% w/w, preferably in the range of 0.05% to 20% w/w.

The salt of secondary nutrient or micronutrient may be present as a solid powder. It may, for example, be in the form of particles or granules. In this form the salt may be coated with the benzoic acid or derivative.

It is has found to be particularly advantageous if the secondary nutrient or micronutrient is present in combination with, for example complexed with, another compound or material. It is particularly preferred if the secondary nutrient or micronutrient is chelated or forms part of a chelated complex with the additional compound, e.g. it is combined with a chelating agent. In particular the secondary nutrient or micronutrient may be present in combination with, for example is complexed with, a chelating agent that is a nutritional product and/or growth stimulant. Examples include lignans and lignic acids (lignos), seaweed extract, citric acid, humic acids, fulvic acids, ulmic acids and amino acids. They may be obtained from any suitable source such as seaweed extract powders, humic and fulvic acid powders and amino acid powders. The secondary nutrient or micronutrient is preferably present in the composition as a complex, e.g. a chelated complex, with lignans and lignic acids (lignos), citric acid, humic acids or amino acids. Suitable lignans include calcium, potassium, sodium and ammonium lignosulphates.

The total concentration of all such chelating agent present may be in the concentration range of 0.01% to 10% w/w, preferably in the range of 5% to 10% w/w. The concentration of an individual chelating agent will depend upon its particular nature. Where the chelating agent is a lignan it may be present in the concentration range of 5% to 10% w/w, preferably 7% to 8% w/w. Where the chelating agent is a citric acid it may be present in the concentration range of 0.5% to 2.0% w/w, preferably about 1%. Where the chelating agent is an amino acid it may be present in the concentration range of 0.1% to 10% w/w, preferably about 0.3% to 8% w/w. A preferred concentration for glycine is 3% to 7% w/w, preferably approximately 5%. A preferred concentration for arginine is 0.1% to 2% w/w, preferably approximately 0.5%.

The benzoic acid may be present as benzoic acid or in the form of a derivative thereof or as a mixture of benzoic acid and a derivative thereof. Any biologically suitable, non-phytotoxic, benzoic acid derivatives may be used. Examples include mono-, di- or tri-substituted benzoic acid, with suitable substituents including halo (e.g. Cl, F), alkyl (e.g. methyl, ethyl, etc.), alkoxy (e.g. methoxy, ethoxy) and hydroxy. Suitable benzoic acid derivatives include salicylic acid (1-hydroxy benzoic acid) and dicamba(3,6-dichloro-2-methoxy benzoic acid).

Acceptable benzoic acid derivatives include compounds containing a benzoic acid group or derivative thereof and include compounds of formula (V)

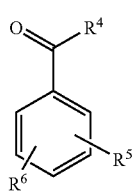

(V)

where $R^4$ is a group $OR^7$, $SR^7$ or $NR^7R^8$ where $R^7$ and $R^8$ are independently selected from hydrogen or hydrocarbyl, and $R^5$ and $R^6$ are independently selected from hydrogen, a hydrocarbyl group or a functional group, or $R^5$ and $R^6$ together with the carbon atoms to which they are attached form a fused ring system which may include one or more heteroatoms, selected from oxygen, nitrogen or sulphur.

In particular $R^4$ is a group $OR^9$ where $R^9$ is hydrogen or $C_{1-6}$alkyl such as methyl. Preferably $R^4$ is OH.

As used herein, the term "functional group" refers to reactive groups, in particular to electron withdrawing groups such as $OR^{10}$ or $C(O)R^{10}$ where $R^{10}$ hydrogen or $C_{1-6}$alkyl such as methyl.

Suitably $R^5$ and $R^6$ are hydrogen, or one is hydrogen and the other is a functional group, arranged at the ortho position on the ring, such as OH or $C(O)CH_3$.

Alternatively, $R^5$ and $R^6$ together with the carbon atoms to which they are attached, which are preferably adjacent carbon atoms, form a fused ring system, which is preferably ring containing 5 or 6 atoms, preferably 5 atoms, at least some of which are heteroatoms. The ring is suitably aromatic in nature. A particular example of a ring system of this type is 1,2,3-benzothiadiazole.

Particular examples of compounds of formula (V) include salicylic acid, acetyl salicylic acid (or 2-acetoxy benzoic acid), methyl salicylate, benzoic acid, and acibenzolar-S-methyl, as well as agriculturally acceptable salts thereof.

The benzoic acid or derivative is suitably present within the composition or formulation of the present invention as a salt thereof and preferably as a water-soluble salt thereof. For use in the present invention suitable water-soluble salts of benzoic acid or its derivative include sodium, calcium, magnesium, manganese, nickel, iron, zinc, chromium, potassium, ammonium and mono-, di-, tri and tetra-alkyl ammonium salts. Organic salts or derivatives may also be used, e.g. esters or amides of the benzoic acid or derivative thereof, in particular alkyl esters such as $C_{1-10}$alkyl esters may be used. For benzoic acid, sodium salts such as sodium benzoate are preferred. For salicylic acid, acetyl salicylate is particularly suitable.

Synthetic or natural forms of the benzoic acid or derivative may be used. Natural forms include essential oils that have benzoic acid or a derivative thereof as a major component. As an example, the main component of wintergreen oil is methyl salicylate. Examples of essential oils that include salicylic acid or salicylates include wintergreen oil and oils from *Chenopodium*, *Erythroxylum*, *Eugenia*, *Gaultheria*, *Myristica*, *Syzygium*, *Xanthophyllum*, *Cinnamonium*, *Gualtheria*, *Gossypium* and *mentha*.

The benzoic acid or derivative is suitably present within the composition or formulation of the present invention at a rate of up to 2%, preferably 0.001 to 0.5%, v/v. The benzoic acid or derivative may be present, for example, in an applied formulation at a rate of upwards of 1 g/L. The benzoic acid or derivative may be present in the concentration range of 0.001% to 1.000% w/w, preferably in the concentration range of 0.003% to 0.500% w/w and more preferably in the concentration range of 0.005% to 0.300% w/w.

For the water soluble salt of formula (I) M may be a metal cation, such as an alkali metal in particular potassium or sodium (where n is 1) or an alkaline earth metal such as magnesium where n is 2, provided that the salt formed therefrom is water soluble. Therefore M is suitably other than calcium. The salt may be in the form of a water miscible oil (such as the potassium and sodium salts) or it may be in the form of a solid, such as the magnesium salt.

Alkyl or alkenyl groups $R^1$ may be straight or branched. Preferably however, $R^1$ is a straight chain alkyl or alkenyl group.

In a particular embodiment $R^1$ contains 5 carbon atoms. It is preferably selected from a pentyl group, making the compound of formula (I) a dihydrojasmonate salt, or it is a pent-2-enyl group, so that the compound of formula (I) is a jasmonate salt.

Suitably, the compound of formula (I) is a water-soluble salt of a derivative of dihydrojasmonic acid. A particularly preferred salt therefore is magnesium dihydrojasmonate. This salt has very good handling and flow properties, making it particularly useful in the context of agrochemical formulations.

In one embodiment of the present invention in the compound of formula (I) M is as described above provided that when $R^1$ is a pent-2-enyl group, M is other than sodium or potassium.

The salt of the compound of formula (I) may be present in the concentration range of 0.001% to 1.000% w/w, preferably in the concentration range of 0.003% to 0.500% w/w, more preferably in the concentration range of 0.003% to 0.100% w/w and most preferably in the concentration range of 0.005% to 0.050% w/w.

Compounds of formula (I) may be prepared using a method comprising reacting a compound of formula (II)

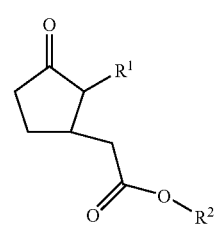

(II)

where $R^1$ is as defined in relation to formula (I) and $R^2$ is selected from hydrogen or a hydrocarbyl group, with a compound of formula (III)

$$M^{n+}(OR^3)_n \quad (III)$$

where M and n are as defined in relation to formula (I), and $R^3$ is hydrogen or a $C_{1-3}$alkyl group such as methyl. The reaction is suitably effected in a solvent, which may be water, or an organic solvent such as an alkanol, in particular methanol or toluene.

Depending upon the particular salt being prepared, the reaction may be effected at moderate temperatures, for example from 0 to 50° C., conveniently at room temperature, or it may be conducted at elevated temperatures, for example from 50° C. to 100° C., and conveniently at the reflux temperature of the solvent.

The product is suitably recovered either as a solid following evaporation of solvent, or it may be in the form of an aqueous solution, which is used directly in formulations.

As used herein, the term "hydrocarbyl" refers to organic moieties comprising carbon and hydrogen, such as alkyl, alkenyl, alkynyl, aryl or aralkyl groups such as benzyl. The term "alkyl" refers to straight or branched chains which suitably contain from 1 to 20, and preferably from 1 to 10 carbon atoms. Similarly the terms "alkenyl" and "alkynyl" refer to unsaturated hydrocarbyl groups, suitably containing from 2 to 20 and preferably from 2 to 10 carbon atoms. The term "aryl" refers to aromatic hydrocarbyl groups such as phenyl and naphthyl, whereas the term "aralkyl" refers to alkyl groups that are substituted with aryl groups such as benzyl.

In a particular embodiment, where $R^2$ is a hydrocarbyl group, it is selected from a $C_{1-10}$alkyl group, and suitably a $C_{1-6}$alkyl group such as methyl.

The compounds of formula (III) are known compounds such as potassium hydroxide, which may be used directly. Alternatively, the compound of formula (III) may be generated in situ. This may be particularly applicable where M is a magnesium salt, and where $R^3$ is a $C_{1-3}$alkyl group such as methyl. The applicants have found that a good way of preparing this compound is to react magnesium with an $C_{1-3}$alkanol such as methanol in the presence of a catalyst such as iodine. The reaction mixture is suitably heated to form the compound of formula (III) whereupon, a solution of the compound of formula (II) in the same alkanol is added and the reaction initiated.

The compounds of formula (II) are either known compounds or they may be prepared using conventional methods. Suitable reaction conditions will be apparent to a skilled chemist, but may include reacting the compound of formula (II) where $R^2$ is a hydrocarbyl group with a base such as sodium hydroxide, and then with an acid such as hydrochloric acid.

Compounds of formula (I) may include a chiral centre, and the invention includes all forms, including optically active forms, and mixtures thereof in all proportions including racemic mixtures.

The present invention is advantageous as the composition leads to improved uptake of trace elements by a plant to which the composition is applied. The components of the composition, i.e. the benzoic acid or derivative thereof, the compound of formula (I) and the secondary nutrient or micronutrient, work synergistically, in that together they enhance the uptake of the nutrient material supplied to the plant. The compositions improve the plant's ability to take up nutrients during conditions of prolonged or transient stress. In particular, they improve nutrient recovery during such conditions as dry soil, high temperature, low temperature, high diurnal temperature variation, water logging, extremes of pH and extremes of salinity. By improving continuity of nutrient supply during varying conditions, the present invention allows the quality of growth of a plant, and in particular a crop, to be improved. The present invention can help, particularly during stress conditions, to reduce plant disease that is associated with reduced nutritional status (for example the disease Take All in cereal crops) due to poor nutrient uptake and compartmentalization. It has been found that improvements in nutrient uptake are particularly marked where the secondary nutrient or micronutrient is present in the composition as a complex with lignans and lignic acids (lignos), citric acid, humic acids or amino acids. In such cases the invention additionally uses chelation to improve trace element nutrition. The compositions are also advantageous as they increase stress and disease resistance in plants by increasing the plant 'Systemic Acquired Resistance' (SAR) by stimulating production of phytoalexins and reducing ethylene (a stress hormone) synthesis.

As outlined above, compositions according to the present invention are of assistance to plants in times of stress. When a plant encounters abiotic stress (this can be intense light, herbicide, ozone, heat, chilling, freezing, drought, salinity, flooding, and heavy metal toxicity), the plant increases production of reactive oxygen species (ROS) creating oxidative stress. ROS cause chemical damage to the cellular constituents of the plant. If ROS build up to higher levels than the plant can cope with, protein lysis occurs within cells, and toxic ammonia can build up. This also happens when plants take up too much ammonium from the external environment (usually through fertilisation by urea or ammonium containing fertilisers) and is a major limiting factor in fertiliser use. Jasmonic acid and similar compounds such as jasmonic acid, methyl jasmonate and dihydromethyl jasmonate, are known to stimulate a process called Induced systemic Resistance (ISR), which assists in producing stress and disease tolerance. However, jasmonic acid and its derivatives are generally oils, which are immiscible in water, leading to formulation and application problems. Compounds of formula (I) are suitably used in agrochemical formulations in which the ISR properties may be desirable. The water-soluble nature of the compounds of the invention overcomes formulation problems and availability difficulties, which were present when conventional jasmonates have been employed in this way. Some compounds, however, have the unwanted effect of increasing ROS, which may cause damage to cells and create oxidative stress. This limits the effect of such a compound because it makes it toxic if it builds up in the plant and ultimately becomes a limiting factor in its efficacy for giving abiotic stress tolerance. For instance, it is known that the efficacy of acetyl salicylic acid for giving stress tolerance is limited as it creates oxidative stress when used, and limits calcium flux into cytoplasm (which makes the cell less able to tolerate ammonia build up due to either protein lysis—increased by oxidative stress—or fertiliser use). Similarly, although compounds of formula (I) such as jasmonate compounds can trigger ISR, their use can have the downside (if not moderated) of increasing ethylene production that under certain conditions weakens cell walls by increasing flux of calcium from cell walls into cytosol. Increasing cytoplasmic calcium helps the plant neutralise ammonia that builds up during prolonged abiotic stress, but if calcium is not available to replenish the cell wall calcium (held on calmodulin binding sites) the cell wall loses integrity and the plant is more susceptible to biotic stress.

Thus in a particularly preferred embodiment, the invention provides a composition which further comprises an antioxidant compound.

In a particularly preferred embodiment, the invention provides a composition comprising: (i) a secondary nutrient or micronutrient; (ii) benzoic acid or a biologically acceptable derivative or salt thereof; (iii) a water-soluble salt of a compound of formula (I) as defined above; and (iv) an antioxidant.

Particularly suitably antioxidants include arginine, or a polyamine for which arginine is a precursor such as putriscine, spermine, and spermidine. These compounds have antioxidant properties that can be used to combat ROS buildup during abiotic stress and are also involved in abiotic stress tolerance. A particularly preferred antioxidant is arginine.

In this composition, the compound of formula (I) may increase the formation of polyamines (spermine, spermidine, and putriscine), which are made from arganine (also supplied). The arginine gives immediate relief from oxidative stress, and ensures enough arganine is present to produce polyamines (which as well as being antioxidants, can perform a similar role to calcium in maintaining cell wall integrity, and so have a role in protecting the cell wall and controlling NH4 toxicity).

Furthermore, by supplying a combination of a compound of formula (I) with benzoic acid or a derivative thereof, the efficacy of the individual compounds may be improved, as ethylene build up is moderated.

The ratio of the components used in the composition will vary depending upon the precise nature of these components. For instance components (ii) and (iii) will generally be present in a ratio of from 1:1 to 1:2 w/w.

The amount of antioxidant used may vary also, depending upon its nature. Antioxidants that have hormonal effects such as spermine, spermidine and putriscine may suitably be used quite sparingly, for example in an equivalent amount to component (iii). Thus such compositions may have a composition comprising components (iii):(ii):(iv) in a ratio of 1:1:1 to 1:2:1 w/w However, preferred antioxidants such as arginine, may be present in larger amounts for example up to 20 times as much as component (iii). Thus a preferred composition in this case may have components (iii):(ii):(iv) present in the range of from up to 1:2:20 or 1:1:20, for example from 1:1:10 to 1:2:10 w/w.

The compositions of the present invention may also comprise one or more other agriculturally acceptable component. Examples of such components include water, additional nutrient material, a member of the caffeine family, plant oils, essential oils, metabolic stimulating agents, emulsifiers, thickeners, anti-caking agents, suspension agents, dispersion agents, carriers or excipients and wetting agents.

Suitable members of the caffeine family for use in the present invention include caffeine (3,7-Dihydro-1,3,7-trimethyl-1H-purine-2,6-dione), xanthine (3,7-Dihydro-1H-purine-2,6-dione), theobromine (3,7-Dihydro-3,7-dimethyl-1H-purine-2,6-dione) and theophylline(3,7-Dihydro-1,3-dimethyl-1H-purine-2,6-dione). The most preferred member is caffeine. The caffeine family member may be present at a concentration in the range of 50 to 500 ppm, more preferably in the range 100 to 300 ppm and most preferably around 200 to 250 ppm.

Suitable plant oils for inclusion in the compositions of the present invention include canola oil (oilseed rape oil), soybean oil, cottonseed, castor oil, linseed oil and palm oil.

Suitable emulsifiers for use in the compositions of the present invention include any known agriculturally acceptable emulsifier. In particular, the emulsifier may comprise a surfactant such as: typically alkylaryl sulphonates, ethoxylated alcohols, polyalkoxylated butyl ethers, calcium alkyl benzene sulphonates, polyalkylene glycol ethers and butyl polyalkylene oxide block copolymers as are known in the art. Nonyl phenol emulsifiers such as Triton N57™ are particular examples of emulsifiers, which may be used in the compositions of the invention, as are polyoxyethylene sorbitan esters such as polyoxyethylene sorbitan monolaurate (sold by ICI under the trade name "Tween™"). In some instances, natural organic emulsifiers may be preferred, particularly for organic farming applications. Coconut oils such as coconut diethanolamide is an example of such an compound. Palm oil products such as lauryl stearate may also be used.

Examples of thickeners which may be present in the compositions of the present invention comprise gums, for example xanthan gum, or lignosulphonate complexes, as are known in the art.

Suitable suspension agents that may be included in the compositions of the present invention include hydrophilic colloids (such as polysaccharides, polyvinylpyrrolidone or sodium carboxymethylcellulose) and swelling clays (such as bentonite or attapulgite).

Suitable wetting agents for use in the compositions of the present invention include surfactants of the cationic, anionic, amphoteric or non-ionic type, as is known in the art.

The compositions of the present invention may further comprise one or more essential oil or active components thereof. The compositions may suitably contain no more than 5% w/w of essential oil, more suitably no more than 3% w/w and preferably no more than 1.5% w/w of essential oil. For instance, the composition may contain no more than 1% w/w essential oil.

As used herein, the expression "essential oil" refers to natural aromatic oils, obtainable from plants. Particular essential oils include tagetes oil, such as the oil obtainable *Tagetes erecta* and thyme oil, such as the oil obtainable from *Thymus vulgaris*, Wintergreen oil, Rosemary oil, garlic oil, oils from *Chenopodium, Erythroxylum, Eugenia, Gaultheria, Myristica, Syzygium, Xanthophyllum, Cinnamonium, Gualtheria, Gossypium* and *mentha*. However, essential oils for inclusion in the compositions of the invention are obtainable from in a wide range of plant families including those families listed in the following Table 1. The Table also includes examples of particular species found within each of these families

TABLE 1

| Family |
| --- |
| Acanthaceae |
|     *Adhatoda vasica* (malabar nut) |
| Anacardiaceae |
|     *Anacardum occidentale* (cashew nut) |
| Annonaceae |
|     *Annona reticulata* (bullocks heart) |
|     *Annona squamosa* (custard apple) |
|     *Monodora myristica* (nutmeg) |
| Apiacea (umbelliferae) |
|     *Anethum graveolens* (dill) |
|     *carum carvi* (caraway) |
|     *Carum roxburghianum* (Bishops weed) |
|     *Pimpinella anisum* (aniseed) |
| Apocynaceae |
|     *Nerium oleander* (oleander) |
| Araceae |
|     *Acorus calamus* (flagroot) |
| Asteraceae |
|     *Ageratum conzyaides* (goatweed) |
|     *Artemesia vulgaris* (mugwort) |

TABLE 1-continued

| Family |
|---|
|     *Bulmea balsamifera* (camphor) |
|     *Chrysanthemum indicum* (manzanilla) |
|     *Sausurea lappa* |
|     *Hellianthus annus* (sunflower) |
| Brassicaceae |
|     *Raphanus sativus* (radish) |
| Ceasalpinaceae |
|     *Erythrophleum suaveolens* (ordeal tree) |
| Cappardaceae |
|     *Bosica senegalensis* |
|     *Cleome monophylla* |
| Cellastraceae |
|     *Celastrus angulatus* (Chinese bittersweet) |
| Chenopodiacea |
|     *Chenopodium ambrosiodes* (Sweet pigweed) |
| Clusiaceae |
|     *Calophyllum inophyllgum* (luarelwood) |
| Convulvulaceae |
|     *Convulvulus arvensis* (field bindweed) |
| Cucurbitaceae |
|     *Momordica charantia* (Balsam pear) |
| Dipterocarpaceae |
|     *Shorea robusta* (sal tree) |
| Ericaeae |
|     *Gualtheria procumbens* (wintergreen) |
| Euphorbiaceae |
|     *Jatropha curcus* (Physic nut) |
| Fabaceae |
|     *Butea frondosa* (flame of the forest) |
|     *Gliricidia sepium* (Madre de Cacao) |
|     *Psoralea coylifolia* |
|     *Pongamia glabra* (karanja) |
|     *Trigonella foenum* (fenugreek) |
| Graminaceae |
|     *Cymbopgon martini* (gingergrass) |
|     *Oryza sativa* (rice) |
| Laminaeae |
|     *Bystropogon* spp. |
|     *Coleus amboinicus* (oregano) |
|     *Hyptis spicigera* (black sesame) |
|     *Hyptis suaveolens* |
|     *Lavendula angustifolia* (lavender) |
|     *Mentha arvensis* (cornmint) |
|     *Mentha longifolia* (Horsemint) |
|     *Mentha piperita* (peppermint) |
|     *Mentha spicata* (spearmint) |
|     *Osimum basilicum* (sweet basil) |
|     *Osimum canum* (American basil) |
|     *Osimum kilimandscharicum* |
|     *Osimum suave* (wild basil) |
|     *Origanum vulgarae* (oregano) |
|     *Pogostemon heyneanus* |
|     *Rosmarianus officianis* (rosemary) |
|     *Salvia officianalis* (sage) |
|     *Thymus vulgaris* (garden thyme) |
|     *Tetradenia riparia* |
| Lauraceae |
|     *Cinnamomum aromaticum* (cassia) |
|     *Luaris nobilis* (sweet bay) |
| Liliaceae |
|     *Allium* |
|     *Allium sativum* (garlic) |
| Meliaceae |
|     *Azadirachta indica* (neem) |
|     *Melia azedarach* (Persian lilac) |
| Menisperaceae |
|     *Cissampelos owariensis* (Pareira brava) |
| Myrsinaceae |
|     *Embelia ribes* |
| Myrtaceae |
|     *Eucalyptus* spp. |
|     *Eucalyptus citriodara* (lemon-scented gum) |
|     *Eucalyptus globus* (Blue gum tree) |
|     *Eucalyptus terreticornis* |
|     *Psidium guajava* (guava) |
|     *Syzygium aromaticum* (clove) |
| Myristicaceae |
|     *Myristica fragrans* (mace) |
| Piperaceae |
|     *Piper cubeda* (java long pepper) |
|     *Piper guineense* (Ashanti pepper) |
|     *Piper nigrum* (black pepper) |
| Ranunculaceae |
|     *Nigella sativa* (black cumin) |
| Rutaceae |
|     *Aegle marmelos* (Bengal quince) |
|     *Citrus aurantifolia* (lime) |
|     *Citrus limon* (lemon) |
|     *Citrus paradisi* (grapefruit) |
|     *Citrus sinensis* (sweet orange) |
|     *Limonia acidissima* (roem) |
|     *Zanthoxylum alatum* (prickly ash) |
| Simarubaceae |
|     *Quassia Africana* |
| Solanaceae |
|     *Capsicum annum* (bell pepper) |
|     *Capsicum frutescens* (Tabasco) |
|     *Lycopersicon esculentum* (tomato) |
|     *Nicotiana tabacum* (tobacco) |
|     *Withania somnifera* (winter cherry) |
| Vebenaceae |
|     *Clerodendron siphonanthus* |
|     *Lanatana camara* (yellow sage) |
|     *Lippia geminata* (wild sage) |
|     *Vitex negundo* (begunnia) |
| Zingiberaceae |
|     *Afromomum melagueta* (grains of pleasure) |
|     *Alpinia galanga* (greater galangal) |
|     *Curcuma longa* (tumeric) |
|     *Zingiber officinale* (ginger) |

The term "active components thereof" refers to the chemicals within the essential oil which give rise to the desired activity in plants. Such activities include metabolic stimulating effects, antimicrobial effects, insect or arachnid killing or repellent effects, antiviral and viral remediation effects. The oils may be present alone or combinations of different oils may be included.

When essential oils are included in the compositions of the present invention they can stimulate the metabolism of the plant to which the composition is applied, thus increasing the uptake and utilization of the secondary nutrient or micronutrient either by root uptake or foliar absorption. Preferably the essential oil or active component thereof is selected as being one that increases plant metabolic activity in a pathway that utilizes the one or more specific secondary nutrient or micronutrient present in the composition. As a result, the plant will absorb more of that nutrient or nutrients to meet its requirements, and so synergy between the components of the composition can be obtained. For example, wintergreen oil, or similar oils, stimulates the need for calcium and conversely calcium stimulates the need for the compounds present in wintergreen oil. The inclusion of wintergreen oil or a similar oil, or an active component thereof, within the composition of the present invention is, therefore, advantageous. A further example would be to incorporate into a composition of the present invention an essential oil that stimulates pathways related to auxin production. Such essential oils could work synergistically to enhance uptake of the secondary nutrient or micronutrient. In addition, many essential oils have anti microbial or insect or arthropod and nematode repellant or killing activity, and these may be included in the compositions of the present invention.

Apart from essential oils and their active components there exist other agents that may be used in the compositions of the present invention to produce advantageous metabolic stimulating effects. For example, the inclusion of cytokinin in the compositions of the invention may be used to increase the requirement for a particular secondary nutrient or micronutrient.

The agricultural compositions of the present invention may be applied to plants, in particular crop plants, in any conventional manner, e.g. by soil or foliar application. They may be applied to root systems, stems, seeds, grains, tubers, flowers, fruit, etc. as required. Examples of means of application include spraying, e.g. by means of an electrostatic or other conventional sprayer, or drip irrigation methods or fertigation systems, which involve application directly to the soil, so as to allow calcium uptake through the roots.

The compositions of the present invention may be adapted for the means of application, e.g. prepared in a form suited to the required means of application. The compositions of the present invention may take the form of liquid or solid concentrates, which require dilution before application. The compositions may be formed into, for example, water dispersible granules, slow or fast release granules, soluble concentrates, oil miscible liquids, ultra low volume liquids, emulsifiable concentrates, dispersible concentrates, oil in water, and water in oil emulsions, micro-emulsions, suspension concentrates, aerosols, capsule suspensions prills, dustable powders, soluble powders or tablets and seed treatment formulations. Aerosol versions of the compositions may be prepared using a suitable propellant, for example n-butane. The form type chosen in any instance will depend upon the particular purpose envisaged and the physical, chemical and biological properties of the composition.

The compositions of the present invention may be prepared using any conventional techniques and methods. Granules may be, for example, formed either by granulating a composition of the present invention alone or with one or more powdered solid diluents or carriers. Dispersible concentrates may be prepared by mixing a composition of the present invention in water or an organic solvent, such as a ketone, alcohol or glycol ether. Suspension concentrates may be prepared by combining the compositions of the present invention in a suitable medium, optionally with one or more dispersing agents, to produce a suspension. One or more wetting agents may be included in the suspension and a suspending agent may be included to reduce the rate of settling. The components of the compositions may be combined together to form a concentrate that is then mixed with an agriculturally acceptable carrier such as water or a fertiliser before use. Such concentrates form a further aspect of the invention.

In a further aspect the present invention provides a formulation for administration to plants or to the environment of plants, the formulation comprising a composition according to the present invention and a medium in which the composition may be dispersed or dissolved.

Suitable mediums may be solid or liquid dependent upon the nature of the formulation and include any known dispersants or solvents for the composition, for example water or a water miscible liquid, such as n-propanol. The medium is preferably such as to provide formulations that may be used in non-pressurised, hand-actuated spray pumps. The medium is preferably a solvent and most preferably water.

Solid mediums or diluents may include natural clays, kaolin, pyrophyllite, bentonite, alumina, montmorillonite, kieselguhr, chalk, diatomaceous earths, calcium phosphates, pumice, attapulgite clays, fuller's earth, ground corn cobs, sands, silicates, sodium, calcium or magnesium carbonates, sodium bicarbonate, magnesium sulphate, lime, flours, talc, polysaccharides and other organic and inorganic solid carriers.

Liquid mediums or diluents may include water or organic solvents such as a ketone, alcohol or glycol ether. These solutions may contain a surface-active agent (for example to improve water dilution or prevent crystallisation in a spray tank).

The amount of dispersant or solvent, e.g. water, used will depend upon the particular mode of administration of the formulation and to where it is being applied. In general, a formulation according to the present invention may contain from 10-20% v/v of the composition of the present invention with the remainder being dispersant or solvent, e.g. water.

In yet a further aspect the present invention provides a method for supplying a secondary nutrient or micronutrient to plants, which method comprises applying to plants or to the environment of plants a composition or formulation according to the present invention.

The present invention is suitable for use on most crops, but in particular can be used for the treatment of greenhouse crops, vegetables, and fruit crops.

The amount of composition or formulation applied in any particular situation will vary depending upon a number of factors such as the nature of the crop and the level of calcium required. Typically, where the composition or formulation is in the form of a solution the amount of solution applied is sufficient to provide a solution concentration sprayed to run-off-rate of between 2 ml/lt and 20 ml/lt. In a particular embodiment, the invention provides the use of a composition or formulation according to the present invention as a fertilizer, for administration to crops at a rate of from 1 to 30 litres per hectare, and preferably from 1 to 10 litres per hectare.

The compositions and formulations may be used either alone (and in this case, they may be suitable for organic growers) or in conjunction with other agrochemicals such as fungicides, insecticides or acaricides.

According to another aspect of the present invention there is provided a method for enhancing the uptake of a secondary nutrient or micronutrient by plants, which method comprises applying to the plants or to the environment thereof a composition or formulation according to the present invention, or simultaneously or successively in any order, (i) a secondary nutrient or micronutrient (ii) benzoic acid or a derivative thereof and (iii) a water soluble salt of a compound of formula (I).

According to another aspect of the present invention there is provided a method for reducing physiological disorders associated with secondary nutrient or micronutrient insufficiency which method comprises applying to the plants or to the environment thereof a composition or formulation according to the present invention, or simultaneously or successively in any order, (i) a secondary nutrient or micronutrient (ii) benzoic acid or a derivative thereof and (iii) a water soluble salt of a compound of formula (I).

According to another aspect of the present invention there is provided a method of preventing secondary nutrient or micronutrient deficiency in plants which method comprises applying to the plants or to the environment thereof a composition or formulation according to the present invention, or simultaneously or successively in any order, (i) a secondary nutrient or micronutrient (ii) benzoic acid or a derivative thereof and (iii) a water soluble salt of a compound of formula (I).

According to another aspect of the present invention there is provided a method for preventing or alleviating disease or infection in plants which occur in areas of local secondary nutrient or micronutrient insufficiency, which method comprises applying to the plants or to the environment thereof a composition or formulation according to the present invention, or simultaneously or successively in any order, (i) a secondary nutrient or micronutrient (ii) benzoic acid or a derivative thereof and (iii) a water soluble salt of a compound of formula (I).

According to another aspect of the present invention there is provided a method for improving growth habit during conditions of prolonged or transient stress, which method comprises applying to the plants or to the environment thereof a composition or formulation according to the present invention, or simultaneously or successively in any order, (i) a secondary nutrient or micronutrient (ii) benzoic acid or a derivative thereof and (iii) a water soluble salt of a compound of formula (I).

According to another aspect of the present invention there is provided the use of a composition or a formulation according to the present invention as a fertilizer for administration to crops.

In a further aspect, the invention provides a method for improving growth and/or yield and/or quality of higher plants during abiotic stress conditions, which method comprises applying to the plants or to the environment thereof a composition or formulation according to the present invention, or simultaneously or successively in any order, (i) a secondary nutrient or micronutrient (ii) benzoic acid or a derivative thereof and (iii) a water soluble salt of a compound of formula (I).

The compositions can be applied when stress conditions are occurring or when they are expected. Such conditions include intense light, herbicide, ozone, heat, chilling, freezing, drought, salinity, flooding, and heavy metal toxicity. The compositions may reduce stress on plants growing in acidic soils, having a pH of less than 7, for example sandy acidic soils. Furthermore, the compositions may provide an improvement in the performance of nitrogen fertilisers or fertilisers containing nitrogen where the nitrogen is derived from urea, amine (NH2) or ammonium (NH4). This includes both natural and synthetic fertilisers. One of the major limiting factors in the rates of ammoniacal and ureic nitrogen that can be used is ammonia toxicity. By including a composition according to the invention into fertilisers at an appropriate rate, the plant's ability to tackle ammonia toxicity is improved, which means that the rate at which these fertilisers can be applied may be increased.

Thus in a further aspect the invention provides a method for improving the performance of nitrogen fertilisers or fertilisers containing nitrogen, said method comprising applying said fertilisers to plants or to the environment thereof a composition or formulation according to the present invention, or simultaneously or successively in any order, (i) a secondary nutrient or micronutrient (ii) benzoic acid or a derivative thereof and (iii) a water soluble salt of a compound of formula (I).

The method may also include the application of an antioxidant.

The invention will now be particularly described by way of the following examples.

EXAMPLE 1

An agricultural formulation according to the present invention was prepared by admixing the following components.

| Raw Material (Mix Order) | Specification | % w/w formulae |
|---|---|---|
| H$_2$O | | 81 |
| Glycine | Technical grade | 5% |
| arginine | Technical grade | 0.5 |
| Copper nitrate | | 0.5% |
| Zinc nitrate | | 2% |
| Manganese nitrate | | 2% |
| Magnesium nitrate | | 5% |
| Seaweed powder | Ascophylum Nodosum 40% | 02.00 |
| Sodium benzoate | Technical grade | 00.005 (50 ppm) |
| Potassium jasmonate | | 00.005 (50 ppm) |
| Molasses | Beet molasses | 02.00 |
| | Total | 100% |

The effect of this formulation on the health and yield of plants was evaluated as follows.

A two season field trial with replicated plots of cocoa plants was carried out in Costa Rica. One plot was the control plot whilst the plants of the other plot were treated with a 0.5% v/v solution of the above formulation. After the first and second season's growth the crops from the two plots were compared and the results were as follows.

The incidence of disease on the cocoa pods of the control and treated plots were compared. The diseases considered were frosty pod, black pod and Cherelle wilt (a physiological disorder that affects young pods). For both the control and treated plots the incidence of cocoa pod losses due to frosty pod were in the typical range for the region (average: 75%). At the end of the first season black pod incidence was lower, it was more than halved (from 7.5% to 3.0%), in the treated group than in the control group. In the second season a reduction was in black Pod was observed in the treated group, but it was not statistically significant. For both the first and second season Cherelle wilt was lower in the treated group than in the control. For the first season the percentage of pods affected by Cherelle wilt were 3.6% in the treated group and 5.7% in the control. In that first season the percentage of healthy pods increased from 12.1% in the control to 17.5% in the treated group. For the second season the percentage of Cherelle wilt observed in the plots were 1.55% in the treated group and 3.75% in the control.

The yield of cocoa pods of the control and treated plots were also compared. At the end of the first season the treated group had a 10% higher yield than the control: extrapolated to 154 kg ha$^{-1}$ for the treated group as opposed to 140 kg ha$^{-1}$ for the untreated control. Such a comparative increase in yield was not, however, observed for the second season.

The calcium level of cocoa seed obtained by the control and treated plots were also compared. After the second season a 9% increase in calcium level was observed in the treated plot when compared with the control plot.

Although the full benefits of nutrition-based treatments are not usually fully realised within the first or even second season of treatment, the results show a promising trend. In the first season the number of healthy pods, and thus cocoa yield, was increased after treatment with the formulation of Example 1 and there was a reduction in the incidence of black pod and Cherelle wilt. The reduction in Cherelle wilt was continued through to the second season, when increase in calcium levels was also observed. These benefits would be expected to continue in the following seasons.

EXAMPLE 2

An agricultural formulation according to the present invention was prepared by admixing the following components.

| Raw Material | Grade/Element Content | Units | Quantity/ 1000 Kg |
|---|---|---|---|
| Manganese Sulphate | 31% Manganese | Kg | 458.000 |
| Zinc Sulphate (Anhydrous) | 36% Zinc | Kg | 450.000 |
| Anticake | | Kg | 1.000 |
| Calcium Ligno Sulphate | | Kg | 72.600 |
| Citric acid | | Kg | 10.000 |
| Benzoic acid | | Kg | 3.000 |
| Caffeine | 99% | Kg | 0.200 |
| Dihydrojasmonic acid Magnesium salt | Specially manufactured | Kg | 0.200 |
| L-Arginine | 99% | Kg | 5.000 |

Analysis (Guaranteed Minimum): Zn 16%, Mn 14% w/w

EXAMPLE 3

An agricultural formulation according to the present invention was prepared by admixing the following components.

| Raw Material | Grade/Element Content | Units | Quantity/ 1000 Kg |
|---|---|---|---|
| Ferrous sulphate Anhydrous | 30% Iron | Kg | 510.000 |
| Magnesium Sulphate Anhydrous | 13.2% Magnesium | Kg | 396.300 |
| Benzoic acid | | Kg | 3.000 |
| Anticake agent | | Kg | 1.000 |
| Calcium Lignosulphate | | Kg | 74.300 |
| Citric acid | | Kg | 10.000 |
| Caffeine | 99% | Kg | 0.200 |
| Dihydrojasmonic acid Magnesium salt | Specially manufactured | Kg | 0.200 |
| L-Arginine | 99% | Kg | 5.000 |

Analysis (Guaranteed Minimum): Iron 15%

EXAMPLE 4

An agricultural formulation according to the present invention was prepared by admixing the following components.

| Raw Material | Grade/Element Content | Units | Quantity/ 1000 Kg |
|---|---|---|---|
| Water | Mains water | Kg | 473.450 |
| Glycine | 99% | Kg | 50.000 |
| L-Arginine | | Kg | 5.000 |
| Copper II Nitrate Trihydrate | 99% (26% Copper) | Kg | 20.000 |
| Zinc Nitrate Hexahydrate | 98% (21.5% Zinc) | Kg | 48.000 |
| Manganese II Nitrate | 98% (18.75% Manganese) | Kg | 33.000 |
| Magnesium Nitrate Hexahydrate | 98% (9.2% Magnesium) | Kg | 330.000 |
| Seaweed extract | | Kg | 20.000 |
| Sodium Benzoate | | Kg | 0.050 |
| Potassium Jasmonate 10% w/w solution | | Kg | 0.500 |
| Beet Molasses | | Kg | 20.000 |

| Analysis (Guaranteed Minimum): | Copper | 0.5% w/w |
|---|---|---|
| | Zinc | 1.0% w/w |
| | Manganese | 0.6% w/w |
| | Magnesium | 3.0% w/w |

EXAMPLE 5

An agricultural formulation according to the present invention was prepared by admixing the following components.

| Raw Material | Grade/Element Content | Units | Quantity/ 1000 Kg |
|---|---|---|---|
| Ferrous sulphate Anhydrous | 30% Iron | Kg | 170.000 |
| Zinc sulphate Anhydrous | 36% Zinc | Kg | 170.000 |
| Manganese sulphate | 31% Manganese | Kg | 135.000 |
| Magnesium sulphate Anhydrous | 13.2% Magnesium | Kg | 235.000 |
| Solubor | 20.5% Boron | Kg | 150.000 |
| Copper sulphate Anhydrous | 24.5% Copper | Kg | 45.000 |
| Sodium Molybdate | 38.9% Molybdenum | Kg | 1.300 |
| Benzoic acid | | Kg | 3.000 |
| Anticake agent | | Kg | 1.000 |
| Calcium Lignosulphate | | Kg | 74.300 |
| Citric acid | | Kg | 10.000 |
| Caffeine | 99% | Kg | 0.200 |
| Dihydrojasmonic acid Magnesium salt | Specially manufactured | Kg | 0.200 |
| L-Arginine | 99% | Kg | 5.000 |

| Analysis(Guaranteed Minimum): | Iron | 5%, |
|---|---|---|
| | Manganese | 4%, |
| | Magnesium | 3%, |
| | Copper | 1%, |
| | Boron | 3%, |
| | Molybdenum | 0.05%, |
| | Zinc | 6% |

The invention claimed is:

1. An agricultural composition comprising: (i) a secondary nutrient or micronutrient selected from the group consisting of calcium, magnesium, sodium, chloride or sulphur, copper, cobalt, iron, manganese, boron, molybendum, zinc, silicon or nickel, wherein the total concentration of all secondary nutrient and micronutrient present in the composition is in the concentration range of 0.01% to 40% w/w; (ii) benzoic acid or a biologically acceptable derivative or salt thereof, wherein the benzoic acid or biologically acceptable derivative or salt thereof is present in the composition in the concentration range of 0.001% to 1.00% w/w; and (iii) a water soluble salt of formula (I)

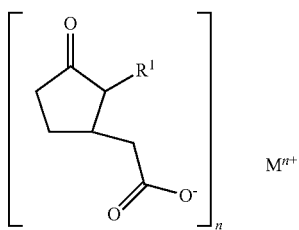

wherein $R^1$ is a pentyl group, so that the compound of formula (I) is a dihydrojasmonate salt, or $R^1$ is a pent-2-enyl group, so that the compound of formula (I) is a jasmonate salt, and M is a metal cation of valency n, selected from the group consisting of an alkali metal cation (where n is 1) or an alkaline earth metal cation (where n is 2), wherein the salt of the compound of formula (I) is present in the composition in the concentration range of 0.001% to 1.000% w/w.

2. A composition according to claim 1 wherein the secondary nutrient is calcium or magnesium and the micronutrient is copper, iron, manganese or zinc.

3. A composition according to claim 1 wherein the secondary nutrient or micronutrient is present in the form of a water-soluble salt.

4. A composition according to claim 3 wherein the water-soluble salt is a nitrate, oxide, sulphate or chloride.

5. A composition according to claim 1, wherein the secondary nutrient or micronutrient is present in combination with a chelating agent, wherein the chelating agent includes one or more of the following: lignans and lignic acids (lignos), citric acid, humic acids or amino acids.

6. A composition according to claim 1, wherein the benzoic acid or salt thereof is benzoic acid or sodium benzoate.

7. A composition according to claim 1, wherein which further comprises one or more of the following agriculturally acceptable components: water, additional nutrient material, a member of the caffeine family, plant oils, essential oils, metabolic stimulating agents, carriers or excipients, emulsifiers, thickeners, suspension agents, anti-caking agents, dispersion agents or wetting agents.

8. A composition according to claim 1, which further comprises an antioxidant.

9. A formulation for administration to plants or to the environment of plants, the formulation comprising a composition according to claim 1 and a medium in which the composition may be dispersed or dissolved.

10. A formulation according to claim 9 wherein the medium is a solvent and that solvent is water.

11. A method for supplying a secondary nutrient or micronutrient to plants, for enhancing the uptake of a secondary nutrient or micronutrient by plants, for reducing physiological disorders associated with secondary nutrient or micronutrient insufficiency, or for preventing or alleviating disease or infection in plants which occur in areas of local secondary nutrient or micronutrient insufficiency, which method comprises applying to the plants or to the environment thereof a composition according to claim 1 or simultaneously or successively in any order, (i) a secondary nutrient or micronutrient selected from the group consisting of calcium, magnesium, sodium, chloride or sulphur, copper, cobalt, iron, manganese, boron, molybendum, zinc, silicon or nickel, (ii) benzoic acid or a biologically acceptable derivative or salt thereof and (iii) a water soluble salt of a compound of formula (I):

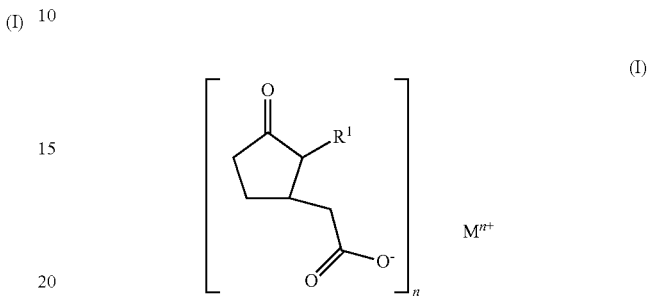

wherein $R^1$ is a pentyl group, so that the compound of formula (I) is a dihydrojasmonate salt, or $R^1$ is a pent-2-enyl group, so that the compound of formula (I) is a jasmonate salt, and M is a metal cation of valency n selected from the group consisting of an alkali metal cation (where n is 1) or an alkaline earth metal cation (where n is 2).

12. A method for supplying a secondary nutrient or micronutrient to plants, for enhancing the uptake of a secondary nutrient or micronutrient by plants, for reducing physiological disorders associated with secondary nutrient or micronutrient insufficiency, or for preventing or alleviating disease or infection in plants which occur in areas of local secondary nutrient or micronutrient insufficiency, which method comprises applying to the plants or to the environment thereof a formulation according to claim 9 or simultaneously or successively in any order, (i) a secondary nutrient or micronutrient selected from the group consisting of calcium, magnesium, sodium, chloride or sulphur, copper, cobalt, iron, manganese, boron, molybendum, zinc, silicon or nickel, (ii) benzoic acid or a biologically acceptable derivative or salt thereof and (iii) a water soluble salt of a compound of formula (I):

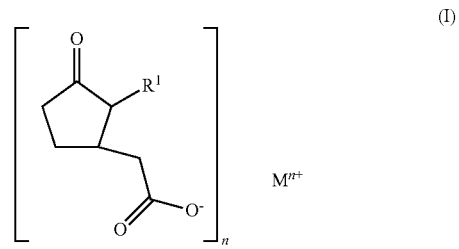

wherein $R^1$ is a pentyl group, so that the compound of formula (I) is a dihydrojasmonate salt, or $R^1$ is agent-2-enyl group, so that the compound of formula (I) is a jasmonate salt, and M is a metal cation of valency n selected from the group consisting of an alkali metal cation (where n is 1) or an alkaline earth metal cation (where n is 2).

* * * * *